(No Model.)
J. MORRISON.
STALK CUTTING ATTACHMENT.
No. 439,169. Patented Oct. 28, 1890.
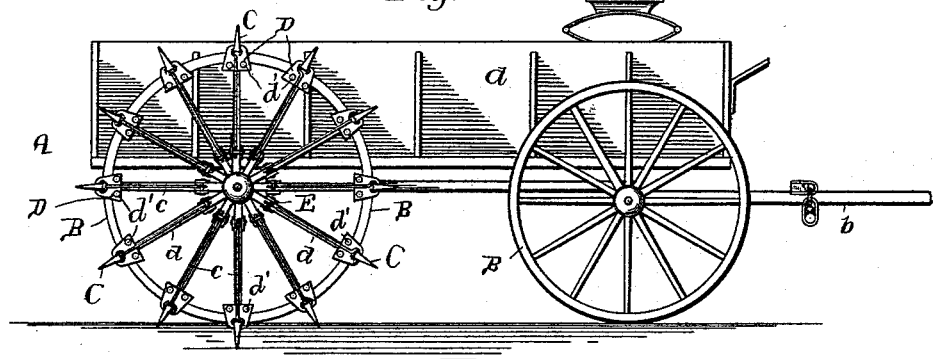
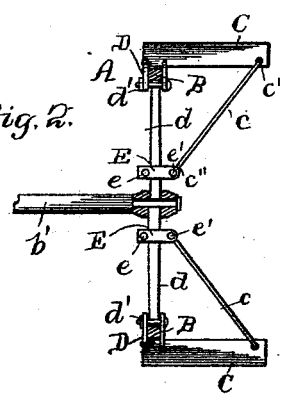
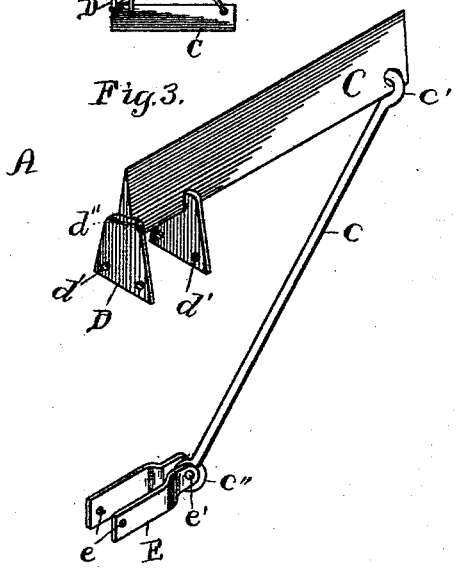
Witnesses
R. A. Balderson
E. E. Todd.
Inventor
John Morrison
By his Attorneys
Higdon & Higdon

UNITED STATES PATENT OFFICE.

JOHN MORRISON, OF KANSAS CITY, MISSOURI, ASSIGNOR OF ONE-HALF TO AUGUST LOHMANN, OF SAME PLACE.

STALK-CUTTING ATTACHMENT.

SPECIFICATION forming part of Letters Patent No. 439,169, dated October 28, 1890.

Application filed February 17, 1890. Serial No. 340,724. (No model.)

*To all whom it may concern:*

Be it known that I, JOHN MORRISON, of Kansas City, Jackson county, Missouri, have invented certain new and useful Improvements in Stalk-Cutting Attachments, of which the following is a full, clear, and exact description, reference being had to the accompanying drawings, forming a part hereof—

My invention relates to improvements in stalk-cutting attachments; and it consists in the novel construction hereinafter set forth and described.

The objects of my invention are, first, to provide a stalk-cutting attachment which can be applied to the wheels of an ordinary farm-wagon, and is secured thereto so that two rows of stalks may be cut at once, and, second, to provide a stalk-cutting attachment, substantially as shown, which may be constructed cheaply and with simplicity, which I do by using the attachments illustrated in the accompanying drawings, in which—

Figure 1 is a side view of a farm-wagon, showing my stalk-cutting attachments secured in position on the rear wheels. Fig. 2 is a sectional view through the wheel, showing the manner in which the knives are secured and braced. Fig. 3 is a detail in perspective of the attachment, showing the manner of construction.

Referring to the drawings by letter, A represents my invention. B are suitable wheels on which the wagon-box $a$ is mounted, said wagon being provided with a tongue $b$ and the necessary doubletree attachments.

C is a wedge-shaped knife, constructed substantially as shown in Fig. 3, having on its rear end two lugs or plates D, which fit over the rim of the wheel, and are secured by bolts $d'$, as shown in Figs. 1 and 2. Said plates D are wrought firmly to the knife-blade and project downward a sufficient distance to pass over the rim of the wheel and to have the bolts $d'$ to pass through them, one to either side of the spokes $d$, as shown in Fig. 1.

E is a sleeve, which fits over the spoke near the hub of the wheel, said sleeve being held in position on the spoke $d$ by bolt $e$, binding them firmly together.

$c$ is a stay-rod or guy, which passes from the outer extremity of knife C, and is secured by an eye $c''$ of the sleeve E by suitable bolt $e'$. The outer plate D is provided with a bolt $d''$ at its rear, which allows it to move and facilitates tightening the same over rims and spokes of the wheel. At the upper end of said rod is a hook $c'$, which passes through a perforation in the outer end of said knife C. This will make the knife rigid and hold it in position when operating over the fields.

These attachments are designed to be secured to the rear wheels only when wagons are used. They may, however, be attached to any heavy two-wheeled vehicle.

Heretofore stalk-cutters which have been constructed were quite complicated, and in many instances the cost was too great to come within the limits of the ordinary farmer. Now by using my device all of the necessary attachments can be constructed very cheaply, and any farmer can secure them in position on the wagon or to other vehicles on which they are to be used. To do this all that is necessary is to place the knives on the rim of wheel, pass the bolts $d'$ through the lugs or plates D, and then with a suitable wrench tighten the nuts until said plates D bear firmly against the rim of wheel. Then secure the sleeve E around the spoke, and secure it in position by a bolt $e$, and the device is ready for use. The eyes $c'$ and $c''$ in stay-rod $c$ may be so constructed that it can be detached from either knife or sleeve; or the eyes may be so constructed that said knife and sleeve will be connected all the time, thereby keeping the attachments together and preventing the loss of same.

Having thus fully described my invention, what I claim, and desire to secure by Letters Patent, is—

1. A stalk-cutting attachment having the knife C, provided at its rear end with plates D, through which pass the bolts $d'$ for securing it rigidly to the rim B of the wheel, substantially as specified.

2. A stalk-cutting attachment having the knife C, provided at its outer end with a stay-rod $c$, which passes downward and is secured to the sleeve E, said sleeve E passing around the spoke of the wheel and held rigidly by suitable bolts *e*, substantially as specified.

3. The stalk-cutting attachments C, composed of knife C, sleeve E, and stay-rod *c*, these being held in position by suitable bolts *d'* and *e* working in combination with the wheels of a vehicle, substantially as specified.

In testimony whereof I affix my signature in presence of two witnesses.

JOHN MORRISON.

Witnesses:
R. A. BALDERSON,
A. A. HIGDON.